(12) United States Patent
Petrick et al.

(10) Patent No.: US 7,600,728 B2
(45) Date of Patent: Oct. 13, 2009

(54) UNIVERSAL MOUNTING SYSTEM FOR A FLAT PANEL DISPLAY

(75) Inventors: Christopher Petrick, Park Ridge, IL (US); Robert Coon, Chicago, IL (US); Bjorn Gunderson, Chicago, IL (US); Jimmy-Quang Viet Doan, Chicago, IL (US); Clifford Krapfl, Chicago, IL (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 55 days.

(21) Appl. No.: 11/410,240

(22) Filed: Apr. 24, 2006

(65) Prior Publication Data

US 2006/0261227 A1    Nov. 23, 2006

Related U.S. Application Data

(60) Provisional application No. 60/675,757, filed on Apr. 28, 2005.

(51) Int. Cl.
*E04G 3/00* (2006.01)
(52) U.S. Cl. ............................. 248/286.1; 248/220.21; 248/223.41; 248/276.1; 248/917; 248/924
(58) Field of Classification Search ......... 248/917–923, 248/431, 435, 169, 171, 172, 222.51, 309.1, 248/286.1, 220.21, 223.41, 276.1, 924
See application file for complete search history.

(56) References Cited

U.S. PATENT DOCUMENTS 4,738,180 A * 4/1988 McKnight ................. 84/385 A
5,362,025 A * 11/1994 Trom et al. ................. 248/670
5,513,829 A * 5/1996 Hodges ...................... 248/670
5,768,096 A    6/1998 Williams et al.

(Continued)

FOREIGN PATENT DOCUMENTS

DE        44 42 642 A1    6/1996

(Continued)

OTHER PUBLICATIONS

International Search Report and Written Opinion from corresponding PCT application PCT/US2006/015787.

(Continued)

*Primary Examiner*—Amy J. Sterling
(74) *Attorney, Agent, or Firm*—Anderson, Gorecki & Manaras LLP

(57) ABSTRACT

A universal flat panel display mounting system includes a central hub and a plurality of telescoping arms pivotably connected to the hub. The arms are intermeshed to provide synchronized movement relative to each other. By telescoping the arms to adjust their length, and adjusting the angles of the arms, connection points on the arms may be positioned so that the universal flat panel display mounting system may work with flat panels in different VESA size categories or for flat panel displays that don't conform to the VESA standard. The universal mounting system is configured to enable the pitch of the flat panel display to be adjusted and to enable the flat panel display to be rotated relative to the mounting system. The mounting system may connect to arms or brackets to enable it to be supported on a pole, a wall mounting system, or in another manner.

11 Claims, 9 Drawing Sheets

U.S. PATENT DOCUMENTS

| | | | |
|---|---|---|---|
| 6,494,429 B2 | 12/2002 | Tajima | |
| 6,587,333 B2 | 7/2003 | Tseng et al. | |
| 6,637,608 B1 * | 10/2003 | Schneider | 211/90.02 |
| 6,845,546 B1 * | 1/2005 | Lu et al. | 16/367 |
| 2002/0011544 A1 | 1/2002 | Bosson | |
| 2003/0141425 A1 | 7/2003 | Obdeijn | |
| 2004/0008477 A1 * | 1/2004 | Tseng et al. | 361/681 |
| 2004/0011932 A1 | 1/2004 | Duff | |
| 2004/0079858 A1 | 4/2004 | Rudolf | |
| 2004/0256526 A1 | 12/2004 | Burns | |
| 2004/0262474 A1 | 12/2004 | Boks et al. | |
| 2007/0040089 A1 * | 2/2007 | Shiff | 248/448 |
| 2008/0061200 A1 * | 3/2008 | Bouissiere | 248/206.5 |

FOREIGN PATENT DOCUMENTS

| | | |
|---|---|---|
| DE | 20 2004 010244 | 9/2004 |
| EP | 1 443 260 A2 | 8/2004 |
| FR | 2319838 | 2/1977 |
| FR | 2 503 430 | 10/1982 |
| JP | 60 000175 | 1/1985 |
| NL | 1 022 21 C1 | 8/2004 |
| WO | WO 2006/010198 | 2/2006 |

OTHER PUBLICATIONS

International Preliminary Report on Patentability from corresponding PCT application PCT/US2006/015787 (9 pages).

* cited by examiner

UNIVERSAL MOUNTING SYSTEM FOR A FLAT PANEL DISPLAY

CROSS-REFERENCE TO RELATED APPLICATIONS

This application claims the benefit of prior provisional application No. 60/675,757, filed Apr. 28, 2005, the content of which is hereby incorporated herein by reference.

BACKGROUND OF THE INVENTION

1. Field of the Invention

The present invention relates to display mounting systems and, more particularly, to a universal mounting system for a flat panel display.

2. Description of the Related Art

Flat panel displays, such as televisions and computer monitors, may be formed using many technologies. Currently, Liquid Crystal Displays (LCDs) and plasma displays are mass marketed as flat panel displays, although other flat panel display technologies also exist and may be developed over time.

Flat panel displays may be supported on desk stands, wall mounts, pole mounts, or may be supported in numerous other ways. For example, the displays may be mounted individually or in groups on a horizontal surface such as a desk, table, floor or ceiling, or may be mounted on a vertical surface such as a wall, cubicle, or other enclosure. Depending on the type of support system, the displays may be free standing or may be more directly connected to another surface such as a wall, ceiling, or other structure.

To enable the same flat panel display to be supported in many different ways, and to enable a given flat panel display to be supportable by many different mounting systems marketed by different manufacturers, the placement of connection locations on the back surface of flat panel displays has been specified in a standard. Specifically, the Video Electronics Standards Association (VESA) has specified the location where connection holes should be provided on the back of flat panel displays so that, as long as the support systems and flat panel displays conform to the VESA standard, any manufacturer's support system should be able to support any other manufacturer's flat panel display.

The VESA standard provides that particular connection hole placements should be used for particular ranges of flat panel display sizes, as measured on the diagonal. Specifically, the VESA Flat Display Mounting Interface Standard, Version 1, Oct. 28, 2002, (VESA-2002-10) specifies individual categories for flat panel displays based on the diagonal dimension of the display. The categories include 4 inch to 7.9 inch diagonal flat displays, 8 inch to 11.9 inch diagonal flat panel displays, 12 inch to 22.9 inch diagonal flat panel displays, 23 inch to 30.9 inch diagonal flat panel displays, and 31 inch to 90 inch diagonal flat panel displays.

Since different hole placements are specified for each of these categories, a mounting system designed to fit to a particular size category may not be used to support a flat panel display in another size category, unless the mounting system is sized for the larger screen size, and contains more than one set of mounting holes. Additionally, not all flat panel display manufacturers conform to the VESA standard. Accordingly, it would still be advantageous to provide a new system that can support flat panels displays in two or more VESA size categories and/or that can support flat panel displays that do not conform to the VESA standard.

SUMMARY OF THE INVENTION

A universal flat panel display mounting system includes a plurality of angularly disposed telescoping arms interconnected at a central hub. The arms are intermeshed to provide synchronized movement relative to each other, and to provide rigidity to the system. By telescoping the arms relative to the hub and properly adjusting the angle of the arms, connection points on the arms may be positioned adjacent a plurality of different hole placements to thereby allow the mounting system to connect to flat panel displays in different VESA categories or to flat panel displays that don't conform to the VESA standard.

The universal mounting system may be used, in connection with a wall mounting system or a pole mounting system, to enable the flat panel display to be supported on a wall, pole, or other support structure. The pole may be, in turn, connected to the ceiling, be part of a freestanding unit or cart system, or may be attached to a surface such as a desk or table. Multiple flat panel displays may be supported by the same support structure if desired. An adjustment system may be used to enable the viewing angle of the flat panel display to be adjusted in one or more directions and for the flat panel display to be rotated.

The universal mounting system optionally may be supported by one or more arms intermediate the support structure and the universal mounting system. For example, one arm may be used to support a relatively small display and two or more arms may be used to support larger displays. The arms may be straight and pivotable relative to the support structure to allow the flat panel display to move laterally relative to the support structure. Alternatively, the arms may be articulated to allow the flat panel display to move toward and away from the support structure, as well as laterally relative to the support structure.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, and dimensions, have not been described in detail so as not to obscure the invention.

Figure 1:
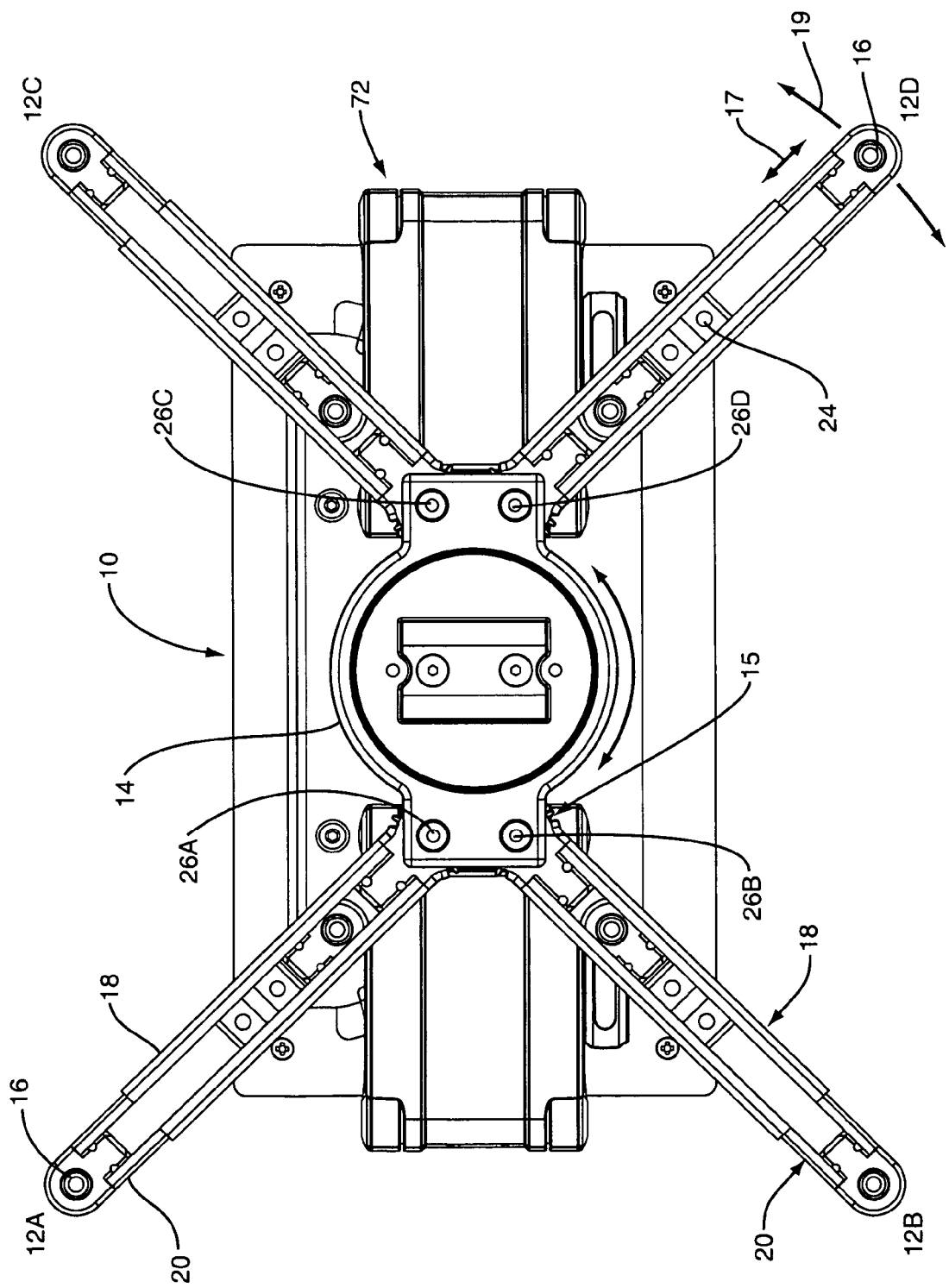
FIG. 1 is a front view of a universal mounting system for a flat panel display connected to a wall mounting system according to an embodiment of the invention.
Figure 8:
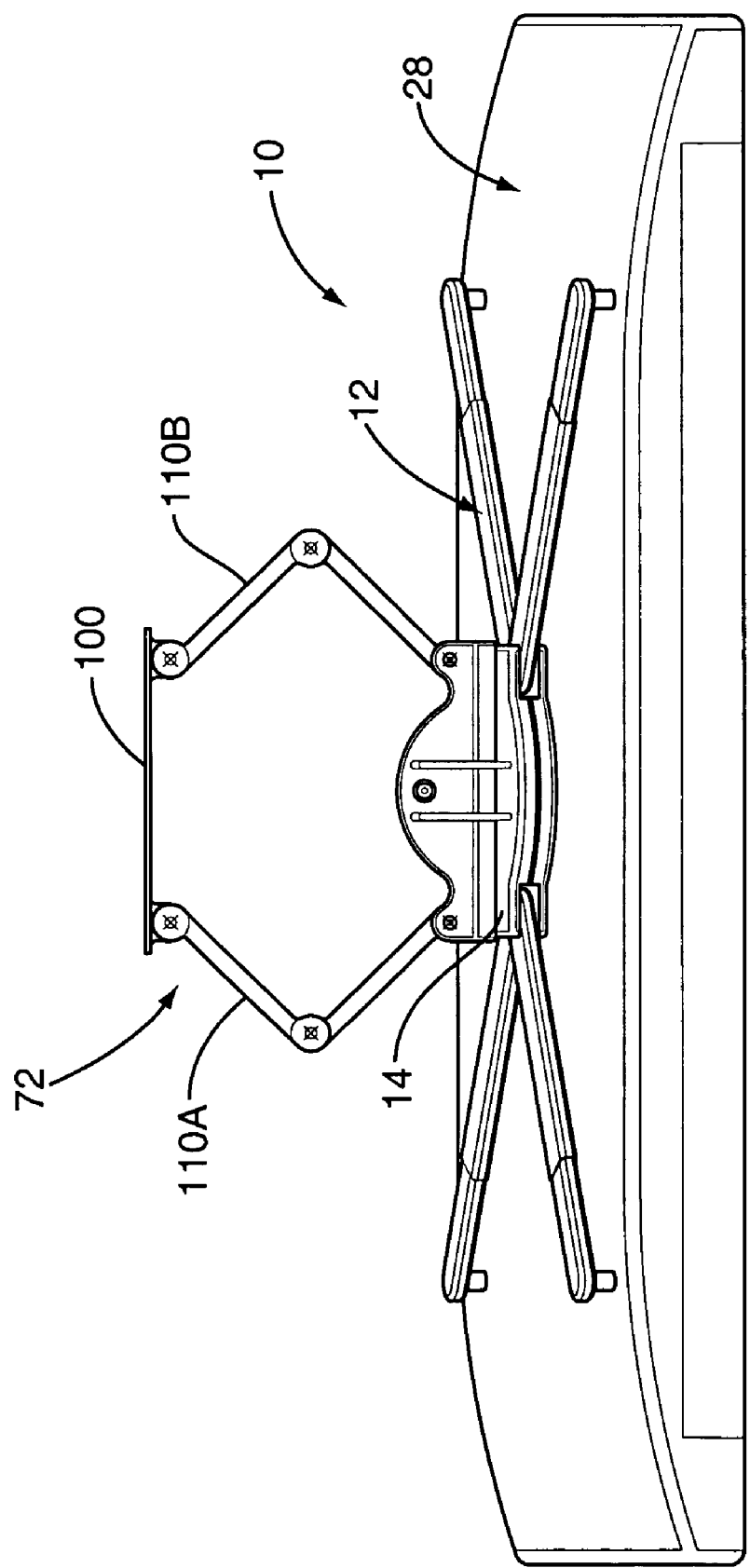
FIG. 8 is a rear perspective view of the universal mounting system and wall mounting system of FIG. 1 connected to a flat panel display.

FIG. 1 illustrates a universal mounting system 10 for a flat panel display 28 (see FIG. 8) according to an embodiment of the invention. The embodiment shown in FIG. 1 is connected to a wall mounting system 72, although the invention is not limited in this regard as the universal mounting system 10 may be used in connection with other wall mounting systems, pole mount systems, and other systems designed to enable the universal mounting system to be supported relative to a horizontal or vertical surface.

As shown in FIG. 1, the universal mounting system 10 includes a plurality of angularly disposed pivotable telescoping arms 12 (12A-12D) interconnected at a central hub 14. An embodiment of the hub is provided in greater detail below in connection with FIGS. 3A and 3B. The arms are intermeshed such as through the use of geared surfaces 15 to provide synchronized movement relative to each other and to provide rigidity to the system. The combination of telescoping movement 17 relative to the central hub and angular movement 19 relative to each other, allows connection points 16 at the ends of the arms to be placed in a variety of connection locations, so that the universal mounting system may be used with flat panel displays with different connection hole placement locations. Thus, the universal mounting system may be used with flat panel displays in multiple VESA categories and/or with flat panel displays that do not conform to the VESA standard. FIG. 4 shows a range of possible connection points that may be possible using the universal mounting system according to one embodiment of the invention. These geared surfaces also equalize the weight of the display monitor on each arm joint by balancing the force acting on one arm with an equal and opposite force from the other arm. This cancels the need for the joints to be tightened with a high degree of force to prevent the monitor/display from dropping or slipping downward.

In the embodiment shown in FIG. 1, the arms 12 include fixed parts 18 and sliding parts 20 that are able to slide (or telescope) relative to the fixed parts 18. The sliding parts 20 may be received, for example, in channels formed in the fixed parts 18 or, alternatively, may be formed to contain a channel to receive the fixed part 18. The sliding parts 20 and fixed parts 18 may be loosely journaled together to enable the two parts to slide relative to each other, although a relatively tight frictional fit may be used as well. Optionally, one or more set screws 24 or other locking mechanism(s) may be used to fix each sliding part 20 relative to its respective the fixed part 18 once the relative spacing of the two parts has been determined. The use of the term "telescoping" as used herein will be used to refer generically to an embodiment in which one part fits within a channel or other structure of the other part, as well as to refer to an embodiment in which the parts are merely secured relative to each other without necessarily extending into each other.

Figure 3A:
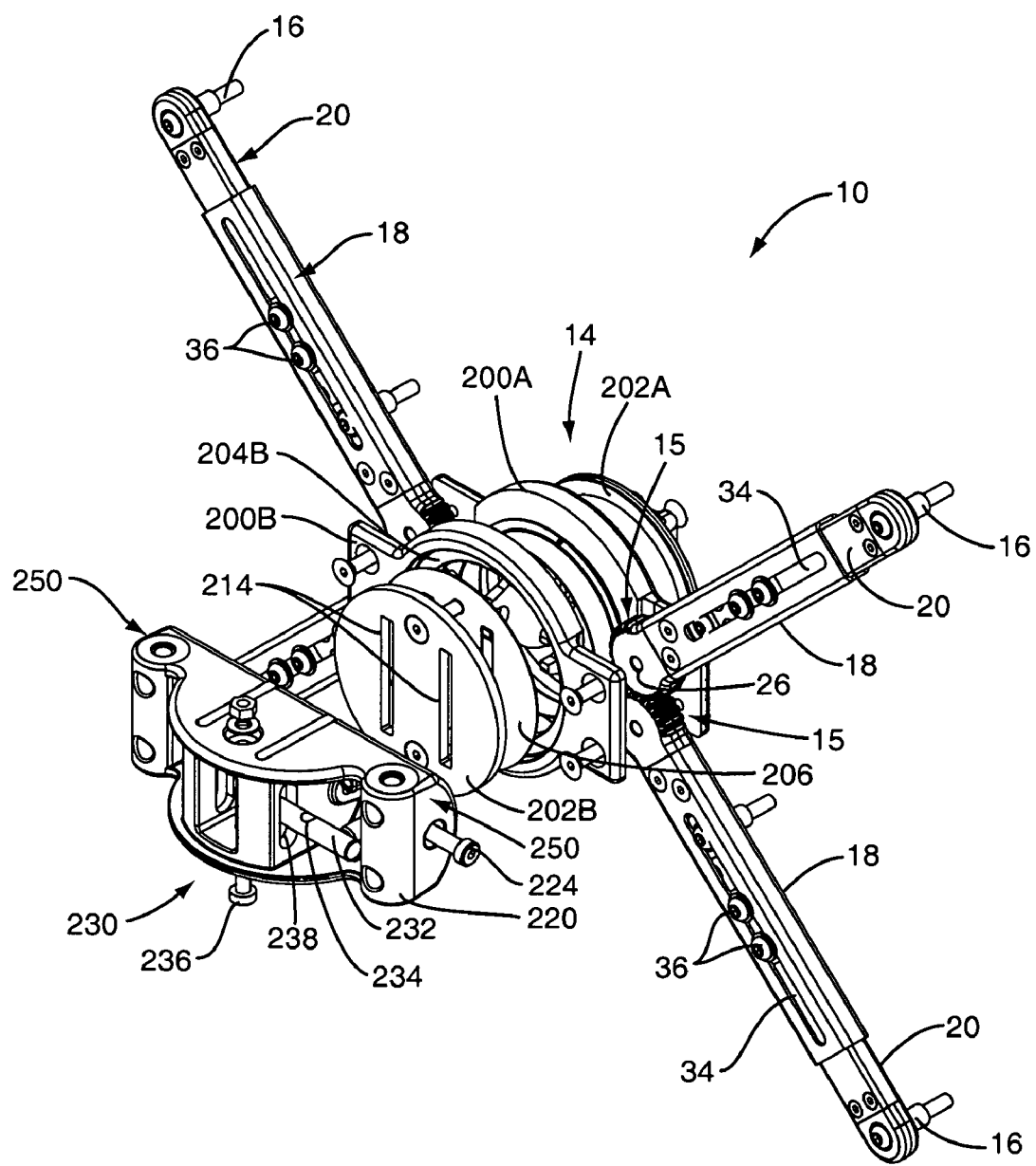
FIG. 3A is a partially disassembled rear perspective view of the universal mounting system of FIG. 1 according to an embodiment of the invention.
Figure 3B:
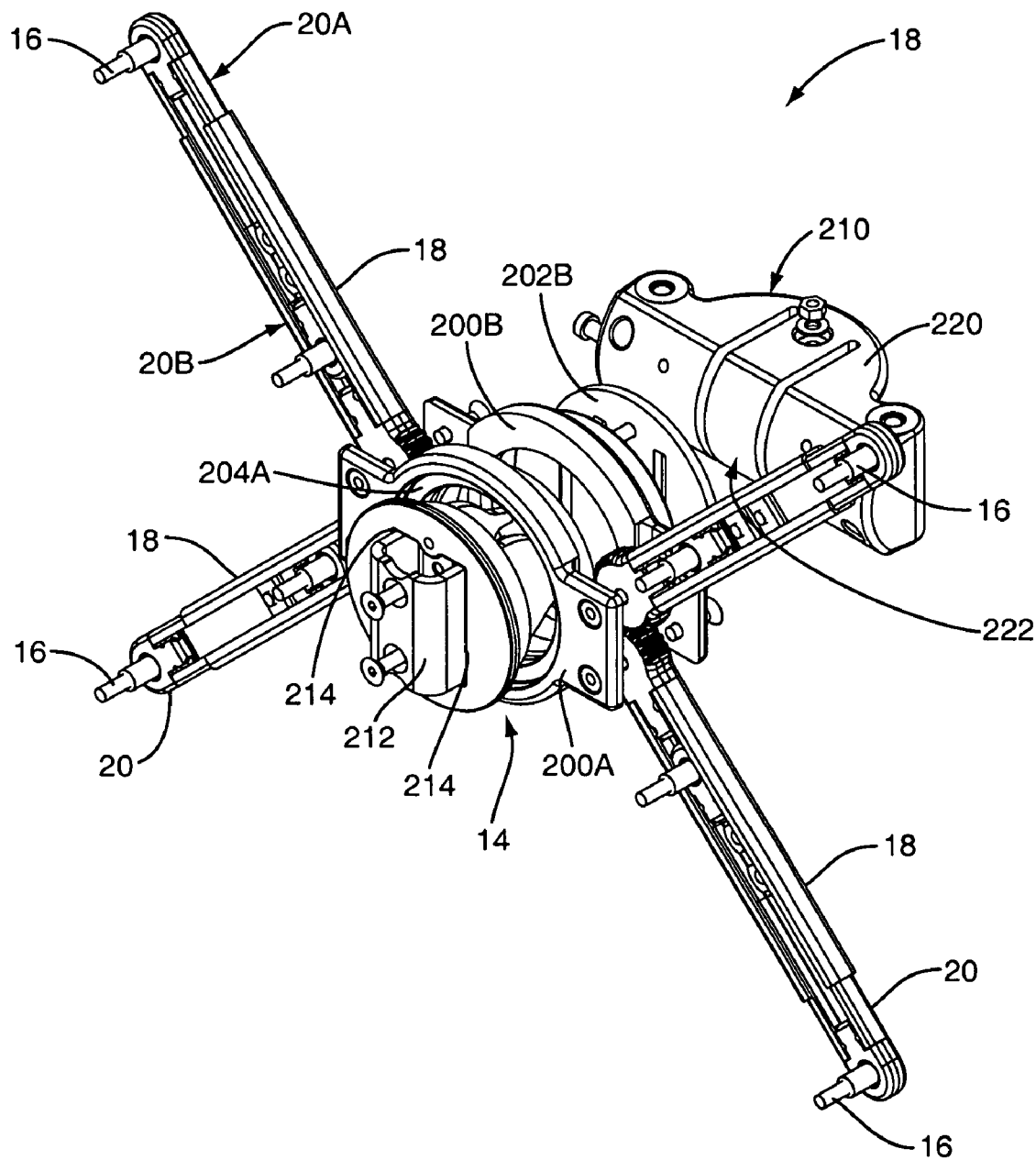
FIG. 3B is a partially disassembled front perspective view of the universal mounting system of FIG. 1 according to an embodiment of the invention.
Figure 4:
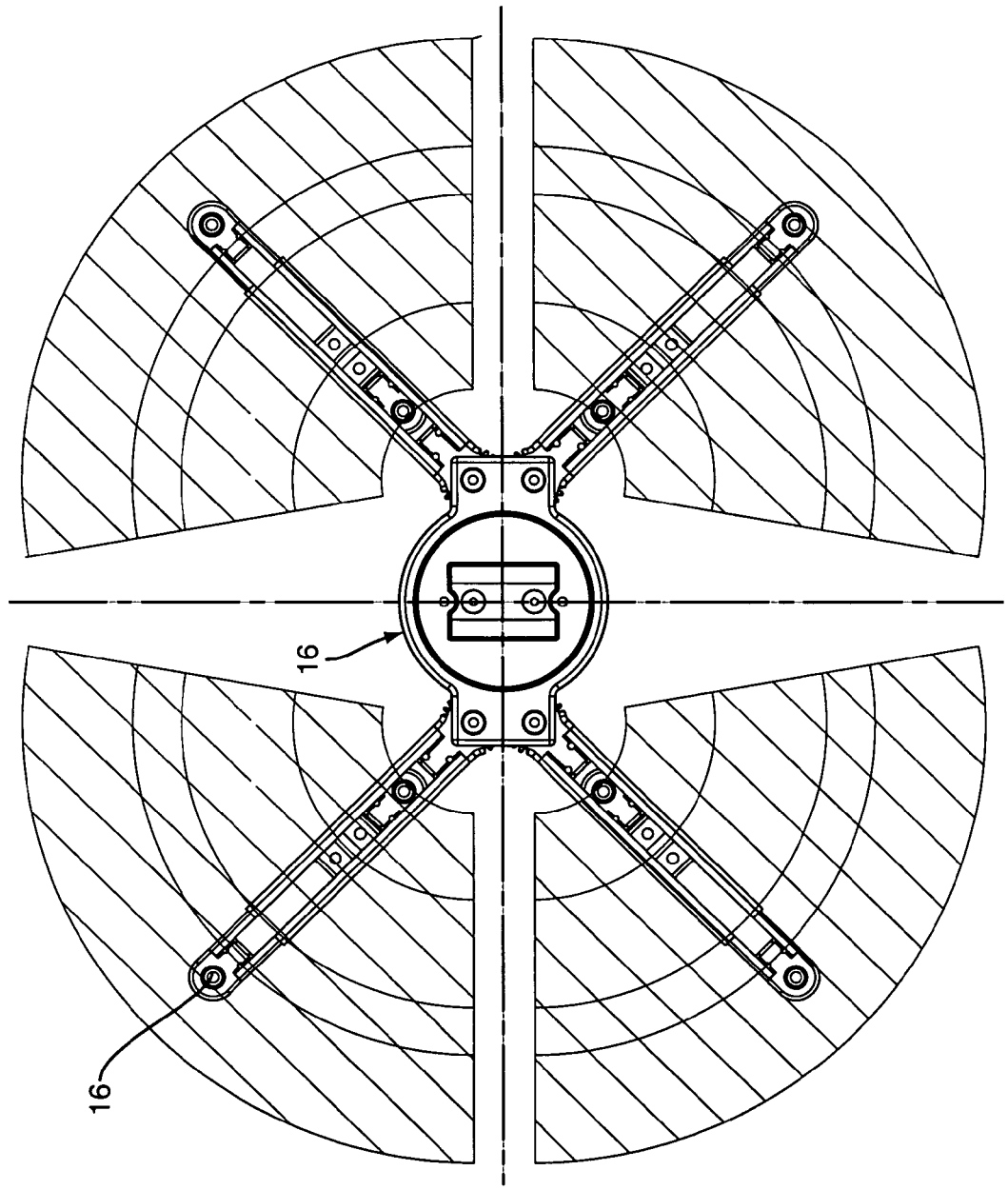
FIG. 4 illustrates the range of possible hole locations that the universal mounting system of FIGS. 1-3 is able to accommodate.

FIGS. 3A-3B illustrate an embodiment of the universal mounting system in greater detail. As shown in FIGS. 3A-3B, each arm includes a fixed part 18 and a sliding part 20. The fixed part may be formed as an elongated U-shaped channel with an elongated slot 34 running along a substantial length of the fixed part of the arm. The channel, in this embodiment, is configured to receive bolts 36 attached to the sliding part 20 so that, when tightened, the bolts may cause the sliding part 20 to be fixed at a particular location along the U-shaped channel. The particular location, in this instance, may be selected so that connection points 16 are positioned to mate with the connection points on the back side of a selected flat panel display. Since the location of the connection points is currently set by standard, optionally the channel may include markings, detents, or other guides to help indicate where the sliding part should be positioned to interconnect with flat panel displays in different size categories under the VESA standard.

The sliding part 20 may be received in the channel so that the connection point 16 is located on a distal end away from the central hub 14 or, alternatively, may be turned around so that the connection point is on a proximal end closer to the central hub. Similarly, sliding parts of different lengths as shown in FIG. 3B may be used to connect with larger and smaller flat panel displays. For example, the embodiments shown in FIGS. 3A and 3B, show two different length sliding parts 20A and 20B that may be serially received in fixed part 18 to allow the universal mounting system to connect to differently arranged hole placements on differently sized flat panel displays. Thus, by selecting the appropriate sized sliding part, and selectively orienting and positioning the sliding part relative to the fixed part of the leg, a full range of connection point locations may be provided relative to the central hub.

For example, FIG. 4 illustrates a range of possible hole locations that the universal mounting system is able to accommodate. As shown in FIG. 4, the universal mounting system is able to position the connection points to a large range of locations on the back of a flat panel display simply by pivoting the arms 12 about the pivot points 26 in the central hub 14 to cause the arms to be pointed in the correct angular directions, selecting an appropriately sized sliding part and orientation for the sliding part, and then moving the sliding parts 20 relative to the fixed parts 18 to cause the arms to telescope to place the connection point 16 at the appropriate radial distance.

In the embodiment illustrated in FIG. 1 the universal mounting system 10 includes four arms. The invention is not limited in this manner, however, as other numbers of arms may be used depending on the type of flat panel display to be supported and the number of flat panel displays to be supported. For example, in an embodiment when two flat panel displays are to be supported, the universal mounting system 10 may be provided with eight arms (4 extending in each direction). Thus, alternate embodiments may be used depending on the particular configuration of the universal mounting system.

The arms 12 are connected together at the central hub 14. The central hub 14 provides a central connecting point so that the universal mounting system 10 may be connected to a support structure, such as a pole mounting system (see FIGS. 6-7) or wall mounting system (see FIGS. 1-2 and 8). The central hub 14 may be formed to be selectively connectable to a pole mounting system or wall mounting system so that the universal mounting system may be used with either type of mounting system. Other mounting systems may be used as well and the invention is not limited to use with the particular illustrated wall mounting system or pole mounting system.

Additionally, the hub in the illustrated example is shown as a single unit that is configured to interconnect with all four arms 12. The invention is not limited in this regard as alternatively, the hub may be formed as two or more separate parts each of which is configured to interconnect two or more of the arms. The invention is thus not limited to an embodiment in which the central hub is configured to interconnect to all four arms exactly as shown in the illustrated example.

The arms are connected to the central hub in such a way as to enable them to pivot relative to each other. For example, in the embodiment illustrated in FIG. 1, the arms 12 are connected to the central hub 14 at pivot points 26A-26D such that they can move relative to each other about the central hub. The pivotal movement of the arms allows pairs of arms to be moved apart from each other so that the connection points 16 may be placed adjacent mounting locations on the back of larger flat panel displays, and to be moved closer together to enable the connection points 16 to be placed adjacent mounting locations on the back of smaller flat panel displays.

In one embodiment, for example as shown in greater detail in FIG. 3B, the arms may contain geared surfaces 15 on the ends that are configured to connect to the hub 14, and arranged on the hub such that the geared surfaces of adjacent arms intermesh. The intermeshed gear surfaces enable synchronized movement of pairs of arms, which enables the hub 14 to remain centered on the flat panel display.

FIGS. 3A & 3B show an embodiment of the universal mounting system in which pivotal movement of the arms is synchronized such that pairs of arms are configured to pivot in opposite directions relative to each other at the same rate relative to the central hub 14. As shown in FIG. 3A, the central hub in this instance has four pivot points 26, each of which is configured to attach to one of the arms. The arms in this embodiment have a rounded end piece that has gear teeth 15 formed on at least a portion of a peripheral outer surface. The gear teeth 15 of adjacent pairs of arms intermesh when the arms are located on the central hub so that movement of one of the arms of the pair will cause concomitant movement of the other arm. In this manner movement of pairs of arms may be synchronized so that the central hub may be maintained in the center of the flat panel display. Other synchronizing systems, such as differently configured gearing mechanisms, a FIG. 8 cabling system, direct linkage, or other mechanical mechanisms may also be used as well.

Figure 2:
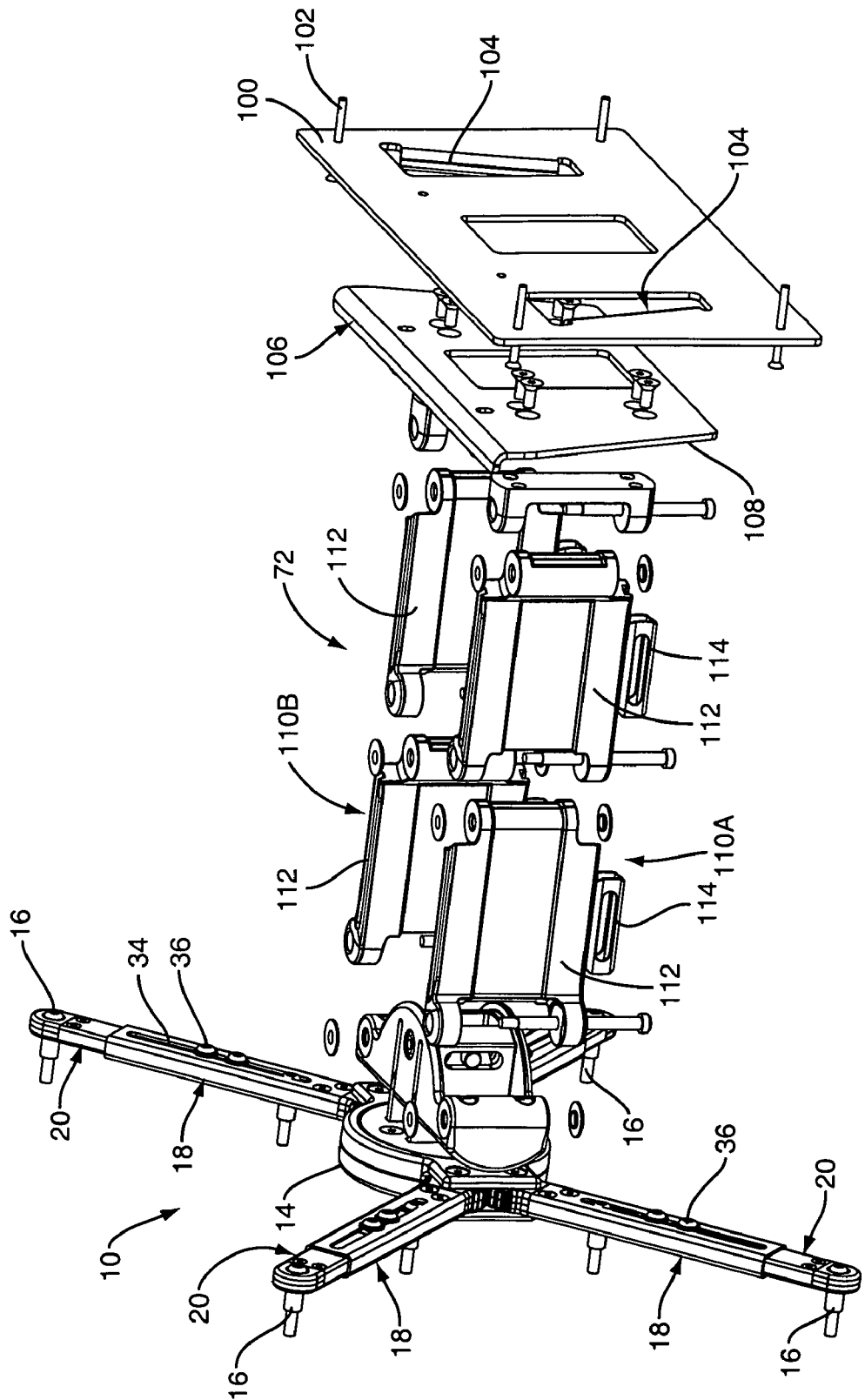
FIG. 2 is a partially disassembled rear perspective view of the universal mounting system connected to a wall mounting system of FIG. 1 according to an embodiment of the invention.

FIG. 2 illustrates the universal mounting system of FIG. 1 attached to a wall mounting system 72. The wall mounting system is also shown in profile in FIG. 8. The wall mounting system shown in FIGS. 2 and 8 includes a wall plate 100, that is configured to be connected to a wall, such as via bolts or screws 102. The wall plate has a V-shaped notch formed out of angled brackets 104 which are sized to receive an attachment plate 106. As shown in FIG. 2, the attachment plate 106 is longer along its top edge than on its bottom edge, so that the side edges 108 are angled to fit into the V-shaped notch on the wall plate. In operation, the attachment plate 106 will slide into the V-shaped notch on the wall plate and be secured relative to the wall plate by brackets 104. The tapered edges 108 fit into the V-shaped notch formed by the angled brackets 104 to prevent the attachment plate from sliding downward relative to the wall plate, while still allowing the wall and attachment plates to be quickly disconnected if necessary for example to replace or repair the flat panel display.

The wall mounting system 72 also includes a pair of arms 110A, 110B that are configured to support the universal mounting system relative to the wall plate. Each arm 110 includes two sections 112 that are bolted together to enable rotational motion relative to each other. The arms 110 are also mounted to be able to pivot relative to the attachment plate 106 and relative to the universal mounting system 10. By enabling the arm sections 112 to pivot relative to each other, and relative to the other pieces of the wall mounting system and universal mounting system, the horizontal angle of a flat panel display attached to the universal mounting system may be adjusted relative to the wall.

Optionally, as shown in FIG. 2, one or more wire management clips 114 may be affixed to the arms 112, such as on a lower edge of the arm pieces 112. The wire management clips enable the wires from a flat panel display mounted on the universal mounting system to be secured along the arm to prevent them from dangling below the mounting system.

Although an embodiment of the wall mounting system has been shown in which two jointed arms are used to support the universal mounting system relative to the wall plate, the invention is not limited in this manner as a single jointed arm or one or more non-jointed arms may be used as well.

FIGS. 3A-3B also illustrate additional details of the manner in which an embodiment of the universal mounting system may be created. As shown in FIGS. 3A and 3B, the universal mounting system is designed to enable the arms carrying a flat panel display 28 (see FIG. 8) to both tilt and rotate, so that pitch and rotational angle of the flat panel display may be adjusted according to the user's preference.

In the embodiment shown in FIGS. 3A and 3B, the universal mounting system 10 includes a pair of arm plates 200A, 200B, that bolt together and connect with the arms 18. The arm plates 200A, 200B, have matching apertures 201 (see FIG. 7) formed in a central region that are configured to enable the arm plates to rotate relative to the rest of the structure of the universal mounting system 10.

The arm plate assembly, formed of the arm plates 200A, 200B, is connected to the rest of the universal mounting system via twist clamp plates 202A, 202B. The twist clamp plates 202A, 202B are respectively configured to fit into a recess 204A in the front arm plate 200A and the rear arm plate 200B. When the twist clamp plates 202A, 202B are bolted together, or otherwise tightened relative to each other, they fit into recesses 204A, 204B, and sandwich the arm plates 200A, 200B. Since the clamp plates fit within the recesses 204 in the arm plates 200, the arm plates are able to rotate relative to the clamp plates. Optionally, one or more washers, such as twist plate bearing washer 206, may be provided to adjust the amount of friction exerted between the clamp plates and the arm plates. By rotating the arm plates and arms 18 about the clamp plate 202, a flat panel display carried on the arms may be rotated relative to the rest of the universal mounting system and wall mounting system.

The arm plate/clamp plate assembly is connected to a tilt assembly 210 via a U-shaped connector bracket 212. The U-shaped connector bracket fits through slots 214 in the clamp plates 202, to enable the arm plate/clamp plate assembly to be connected to the tilt assembly 210. Since the U-shaped connector extends through the central aperture 201 in the arm plates, the are plates are able to be rotated about the U-shaped connector and, hence, relative to the tilt assembly 210.

The tilt assembly 210 includes a tilt bracket 220 that has a curved front surface 222 so that it is able to be angularly adjusted relative to the clamp plate 202B. The tilt bracket also includes one or more bolts 224 configured to engage an aperture 225 in the U-shaped bracket 212 to secure the U-shaped bracket relative to the tilt bracket 220.

Figure 7:
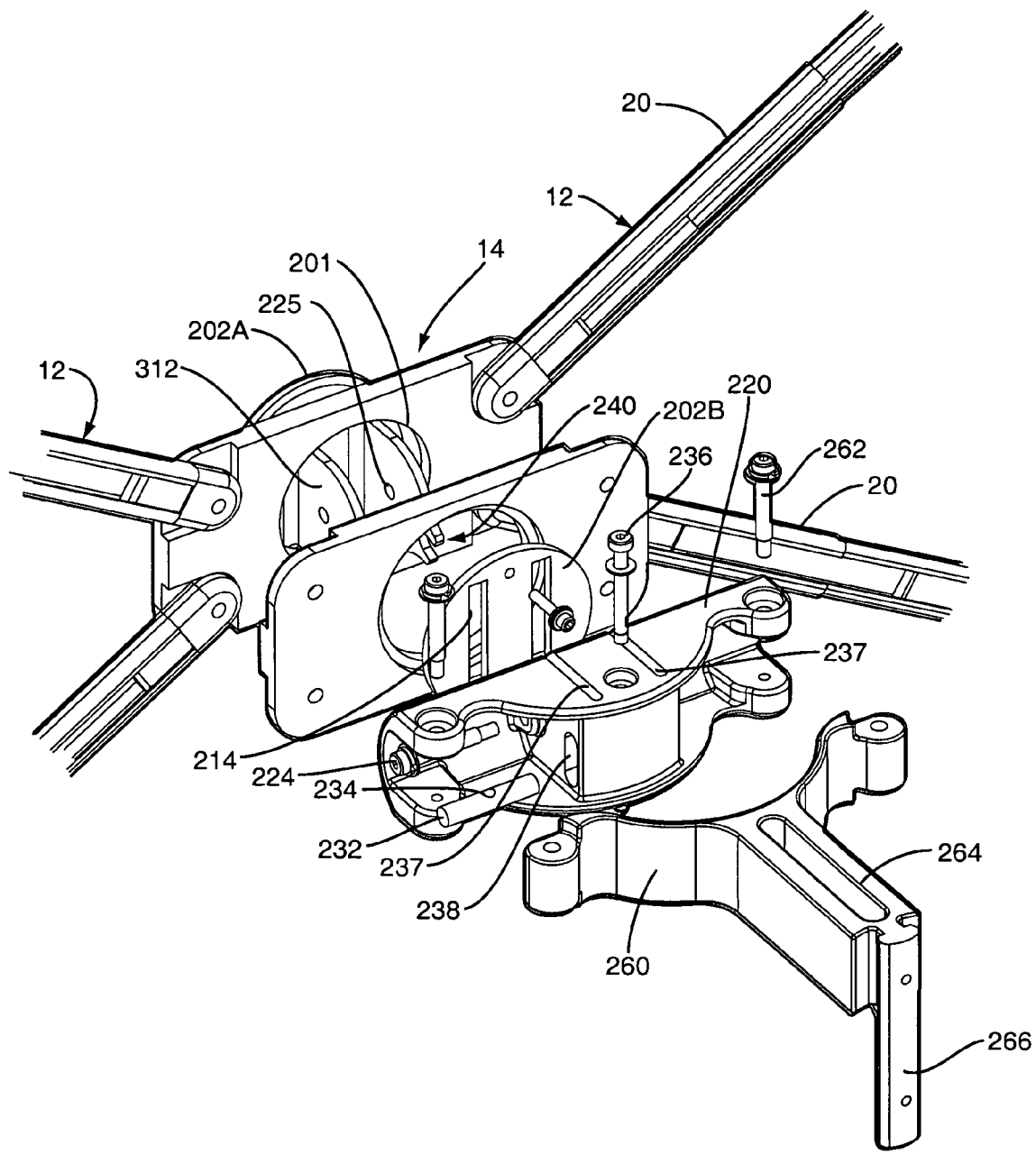
FIG. 7 is a partially disassembled rear perspective view of the universal mounting system of FIG. 6.

As shown in FIG. 3A, to enable the tilt bracket to secure the arm plate/clamp plate assembly at a desired pitch angle, the tilt bracket also includes a tilt adjustment mechanism 230. The tilt adjustment mechanism, in this embodiment, includes a rod 232 having a threaded aperture therein 234 that is designed to mate with a threaded rod 236 (such as an Allen bolt) and slide in elongated slots 238. In operation, by turning threaded rod 236, the rod 232 will be caused to ride on the threads formed on threaded rod 236, thereby causing the threaded rod to move up and/or down within elongated slots 238. The ends of the U-shaped bracket fit into grooves 237 in tilt bracket 220 and are secured in place by bolt t224. The ends of the U-shaped bracket also include nose portions 240, each of which has a pair of prongs designed to fit on either side of the rod 232. Vertical movement of the rod 232 will therefore cause the end, or nose 240, of the U-shaped bracket to move up/down about the bolt 224 that extends through apertures 225 in the ends of the U-shaped bracket, so that the pitch angle of the arm plate/clamp plate may be adjusted. FIG. 7 shows additional details of the hub, as described above, and FIG. 5 illustrates the manner in which the pitch of the arm plate/clamp plate assembly may be adjusted using the tilt assembly.

Figure 5:
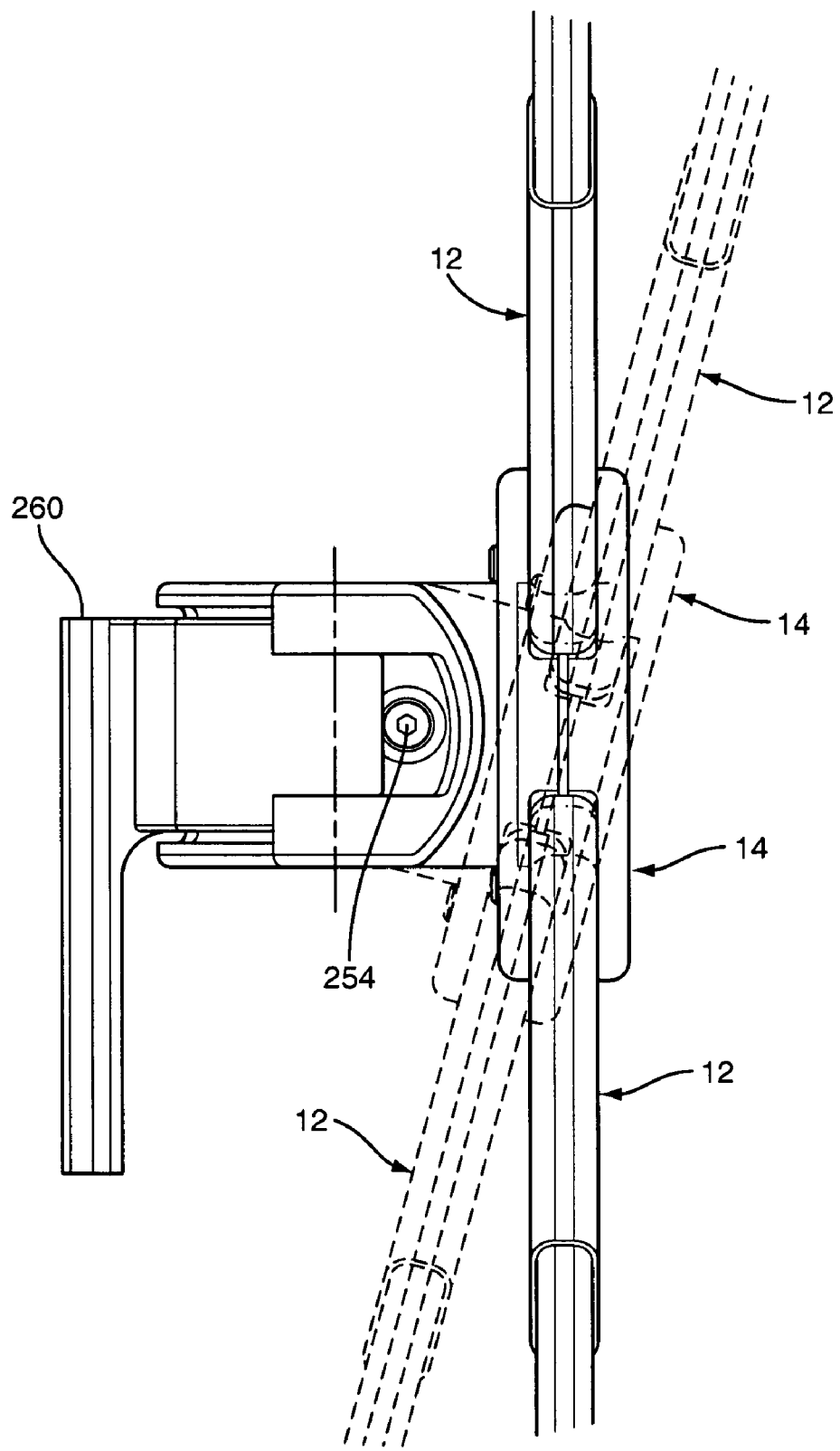
FIG. 5 is a side view of the universal mounting system connected to a short pole spike according to an embodiment of the invention.
Figure 6:
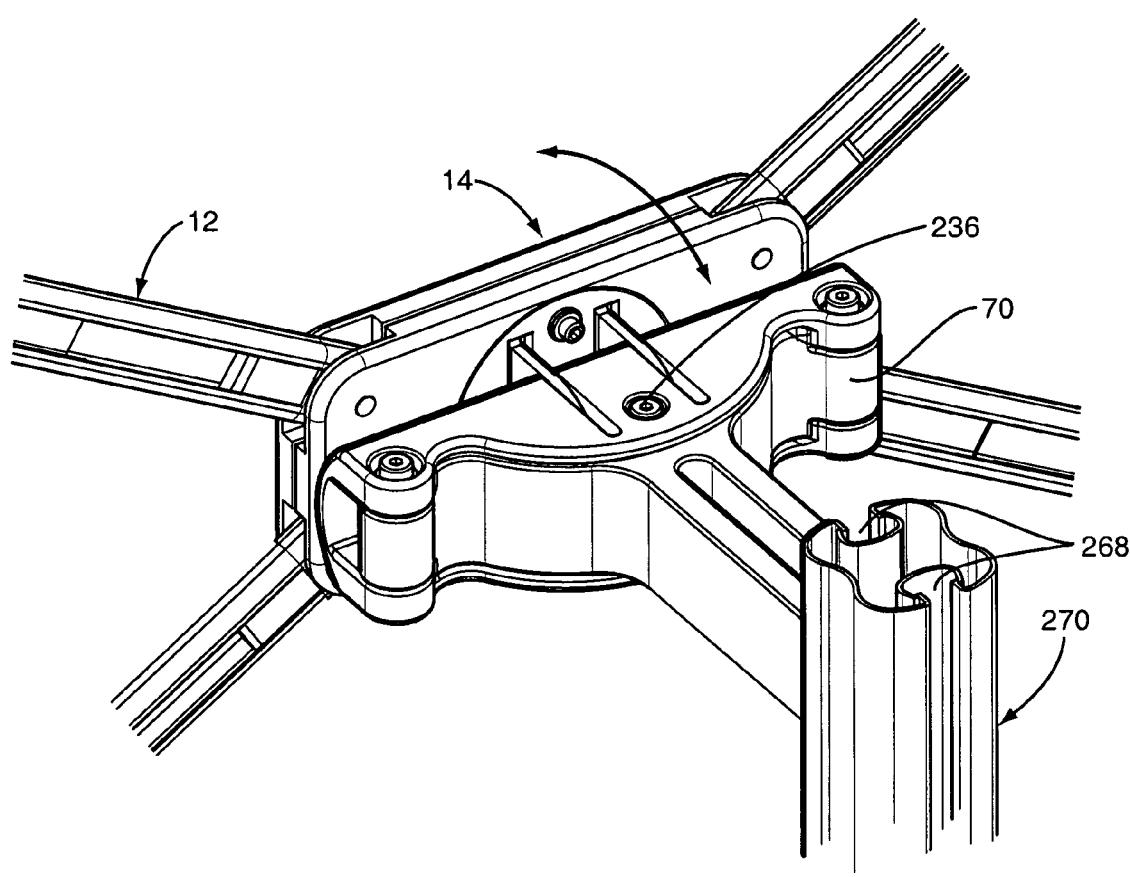
FIG. 6 is a rear perspective view of the universal mounting system connected to a pole spike having a six inch arm according to an embodiment of the invention

The tilt bracket 220 includes connectors 250 on either side that are configured to enable the tilt bracket 220 to connect to the wall mounting system described above or to a spike so that the universal mounting system may be mounted on a pole. FIGS. 5-7 show spikes with different length arms that may be used to connect the universal mounting system to a pole. As shown in FIG. 7, the tilt bracket 220 is configured in this embodiment to connect to a Y-shaped spike mount 260. For example, in the illustrated embodiment, the Y-shaped spike mount 260 bolts to the tilt bracket via bolts 262. The invention is not limited to this particular embodiment as other manners of connecting these pieces may be used as well.

Two different embodiments of the tilt bracket 220 are shown in the FIGS. Specifically, the tilt bracket in the embodiment shown in FIGS. 2, 3A and 3B has cylindrical ends configured to connect to the arms. In this embodiment, the ends of the spike may be configured to fit between the cylindrical portions to bolt to the tilt bracket 220. Alternatively, in the embodiment shown in FIGS. 6 and 7, portions of the cylindrical portions may be cut away to receive mating ends of the spike 260 so that the arm may be connected via the cylindrical portions in the same manner as the arms are connected to the cylindrical portions. The invention is not limited by the particular manner in which the spike is connected to the tilt bracket.

The spike 260 may include an arm portion 264 that may be sized according to the location in which the flat panel display is to be used. For example, the spike 260 in FIG. 5 shows a short arm whereas the spike 260 in FIGS. 6 and 7 shows a relatively longer (i.e. 6 inch) arm. The invention is not limited to the particular arm lengths shown in the figures. The spike 260 includes a downward extending finger 266 configured to engage a slot in a pole such as pole 270 shown in FIG. 6, so that the spike is able to be retained at a desired height along the length of the pole. For example, the finger 266 may be formed to fit into slot 268 in pole 270 so that the height of location of the spike along the length of the pole may be adjusted to the proper location.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A flat panel display mounting system, comprising:
 a central hub;
 a plurality of telescoping arms pivotally connected to the hub, at least two of said plurality of telescoping arms being intermeshed to enable synchronized pivotal movement of the two arms, and
 a wall mounting system, the wall mounting system including a wall plate with a V-shaped notch, and an attachment plate with angled edges configured to fit into the V-shaped notch on the wall plate;
 wherein the arms telescope and pivot to enable the flat panel display system to interconnect with flat panel displays in more than one VESA size category.

2. The flat panel display mounting system of claim 1, wherein each of the arms carries at least one connection point, and wherein the arms are configured to enable the connection points to be positioned in a plurality of different locations to connect with flat panel displays that don't conform to one of the VESA standard hole placements.

3. The flat panel display mounting system of claim 1, wherein the telescoping arms comprise fixed parts and sliding parts, said sliding parts being received in channels in the fixed parts.

4. The flat panel display mounting system of claim 1, wherein the telescoping arms comprise fixed parts and sliding parts, said sliding parts being replaceable to selectively allow the telescoping arms to be made shorter or longer depending on the length of the selected sliding parts.

5. The flat panel display mounting system of claim 1, wherein the telescoping arms comprise fixed parts and sliding parts, each of said sliding parts carrying a connection point close to one end thereof, said sliding parts being securable relative to the fixed parts to enable the connection points to be selectively positioned closer or farther away from the central hub.

6. The flat panel display mounting system of claim 1, wherein the at least two of the plurality of telescoping arms each has a geared surface formed at one end thereof, said geared surfaces being configured to intermesh with each other such that pivotal movement of a first of the telescoping arms will cause the geared surface to move which, in turn, will cause the geared surface of a second telescoping arm to move which will thus cause the other telescoping arm to move.

7. The flat panel display mounting system of claim 6, wherein the geared surfaces provide rigidity to the flat panel display mounting system by preventing unilateral pivotal movement of one of the arms independent of the other.

8. The flat panel display mounting system of claim 1, wherein the central hub comprises at least one arm plate configured to connect to the telescoping arms, and a plurality of clamp plates configured to secure the arm plate in a rotatable configuration therewith.

9. The flat panel display mounting system of claim 8, further comprising a pitch adjustment system connected to at least one of the clamp plates.

10. The flat panel display mounting system of claim 9, wherein the pitch adjustment system comprises a tilt bracket carrying a pitch adjustment assembly.

11. The flat panel display mounting system of claim 10, wherein the pitch adjustment assembly comprises a first rod, a second threaded rod configured to engage the first rod to selectively cause the first rod to move upon ration of the second rod, and a nose configured to translate movement of the first rod to movement of the arm plates.

* * * * *